United States Patent [19]

Williams

[11] 3,926,255
[45] Dec. 16, 1975

[54] WATERFLOODING EMPLOYING SURFACTANTS DERIVED FROM METALLIC SOAPS

[75] Inventor: Sherrod A. Williams, Dallas, Tex.

[73] Assignee: Mobil Oil Corporation, New York, N.Y.

[22] Filed: Nov. 7, 1974

[21] Appl. No.: 521,595

[52] U.S. Cl. .................. 166/270; 166/273; 166/274
[51] Int. Cl.² ......................................... E21B 43/22
[58] Field of Search ........... 166/270, 273, 274, 271, 166/300, 307

[56] References Cited
UNITED STATES PATENTS

| | | | |
|---|---|---|---|
| 1,812,316 | 6/1931 | Berl | 252/425 |
| 2,267,548 | 12/1941 | Berl | 166/275 |
| 3,111,985 | 11/1963 | Reisberg | 166/270 |
| 3,185,214 | 5/1965 | Bernard et al. | 166/270 |
| 3,195,629 | 7/1965 | Leach | 166/273 |
| 3,298,436 | 1/1967 | McCardell | 166/270 |
| 3,344,859 | 10/1967 | Gilchrist et al. | 166/270 |
| 3,368,621 | 2/1968 | Reisberg | 166/270 |
| 3,421,585 | 1/1969 | Garcia | 166/307 |
| 3,581,824 | 6/1971 | Hurd | 166/273 |
| 3,866,685 | 2/1975 | Friedman | 166/294 |
| 3,874,453 | 4/1975 | Friedman | 166/270 |
| R23,360 | 4/1951 | Berl | 252/8.55 |

OTHER PUBLICATIONS

Foster, W. R., "A Low–Tension Waterflooding Process," *Journal of Petroleum Technology*, Vol. 25, Feb. 1973, pp. 205–210.

Cooke, C. E. et al., "Oil Recovery by Alkaline Waterflooding," *Journal of Petroleum Technology*, Dec. 1974, pp. 1365–1374.

*Primary Examiner*—Stephen J. Novosad
*Assistant Examiner*—George A. Suckfield
*Attorney, Agent, or Firm*—C. A. Huggett; William D. Jackson

[57] ABSTRACT

A waterflooding process in which a petroleum oil containing divalent metal soaps is contacted with an inorganic acid in order to convert the soaps to the corresponding organic acids. The organic acids thus obtained may be injected into the reservoir followed by an aqueous alkaline solution. Alternatively, the organic acids may be contacted with an aqueous alkaline solution in order to convert the acids to the corresponding surface-active monovalent salts which may be then injected into the reservoir.

4 Claims, 1 Drawing Figure

U.S. Patent   Dec. 16, 1975   3,926,255
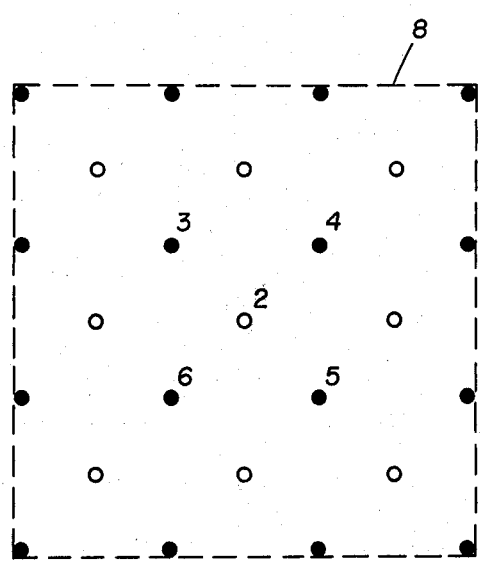

WATERFLOODING EMPLOYING SURFACTANTS DERIVED FROM METALLIC SOAPS

BACKGROUND OF THE INVENTION

This invention relates to the recovery of oil from subterranean oil reservoirs and more particularly to improved waterflooding operations involving the injection into such reservoirs of organic acids derived by acid treatment of a petroleum oil containing divalent metal soaps or the injection of monovalent metal soaps of such organic acids.

In the recovery of oil from oil-bearing reservoirs, it usually is possible to recover only minor portions of the original oil in place by the so-called primary recovery methods which utilize only the natural forces present in the reservoir. Thus, a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus, it has been proposed to add surfactants to the injected water in order to lower the oil-water interfacial tension and/or to alter the wettability characteristics of the reservoir rock. Also, it has been proposed to add thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To date one of the more promising low tension waterflooding techniques involves the injection of aqueous solutions of petroleum sulfonates within a designated equivalent weight range and under controlled conditions of salinity. For example, in a paper by W. R. Foster entitled "A Low Tension Waterflooding Process", JOURNAL OF PETROLEUM TECHNOLOGY, Vol. 25, Feb. 1973, pp. 205–210, there is disclosed a procedure which involves the sequential injection of a protective slug, a surfactant slug, and a mobility control slug. The protective slug is an aqueous solution of sodium chloride which is injected in order to displace the reservoir water ahead of the subsequently injected surfactant slug. The protective slug is substantially free of divalent ions which would tend to precipitate the subsequently injected surfactant.

The surfactant slug comprises an aqueous solution of petroleum sulfonates and contains sodium chloride in a concentration, typically about 1.0 to 2.0 weight percent, which will promote the desired low interfacial tension between the injected water and the reservoir oil. The subsequently injected thickened water slug contains a viscosifier such as a water-soluble biopolymer in a graded concentration in order to provide an initial viscosity greater than the viscosity of the reservoir oil and a terminal viscosity near that of water. Thereafter, a driving fluid such as produced field brine is injected in order to carry the process to conclusion.

While recent emphasis has been placed upon the use of petroleum sulfonates in low tension waterflooding, numerous other surfactants have been proposed for use. For example, U.S. Pat. No. 2,267,548 to Berl suggests the use of long chained organic acids such as oleic, palmitic, and stearic acids and the corresponding soaps. This patent also discloses employing the sodium salts of "so-called tar acids" and states that water-soluble tar acids may be made in accordance with U.S. Pat. No. 1,812,316 or by "adding to water-soluble tar acids of the acid wash in petroleum refining, the alkaline wash liquids from the purification of crude oil fractions." Reference is also made to the use of "water solutions of free tar acids or/and their acid salts." The disclosures in this patent relating to the above-mentioned soaps and tar acids and their salts were later deleted by Reissue Pat. No. 23,360.

Another waterflooding procedure, in which surfactants are formed in situ, involves alkaline waterflooding. In this process an aqueous solution of an alkali metal or ammonium hydroxide or carbonate is injected in order to neutralize organic acids in the reservoir oil to produce the corresponding alkali metal or ammonium salts. Alkaline waterflooding has been proposed in regard to various recovery mechanisms, i.e., to lower the interfacial tension between the reservoir oil and the injected water, to alter or even reverse the wettability of the reservoir, e.g., from oil-wet to water-wet, or for the purpose of mobility control by the formation of a relatively viscous oil and water emulsion.

An improved alkaline waterflooding process is described in U.S. patent application Ser. No. 508,965, filed Sept. 25, 1974, by Ralph F. Burdyn, Harry L. Chang, and William R. Foster, and entitled "Alkaline Waterflooding Process". In this process, an aqueous alkaline solution is employed in which the alkalinity and monovalent salt salinity of the solution are controlled within defined ranges in order to result in low oil-water interfacial tensions which enhance the microscopic displacement of oil from the interstices of the reservoir rock. A thickened water slug may be used for the purpose of mobility control in the alkaline waterflood. As recognized in the Burdyn et al. application, the results achieved by alkaline waterflooding and the roles played by the various recovery mechanisms involved depend to some extent upon the molecular weight distribution of the organic acids within the reservoir oil.

An additional factor which is relevant to the efficacy of an alkaline waterflood is the total acid content of the reservoir oil. This is commonly measured by the "acid number" which is defined as the milligrams of potassium hydroxide required to neutralize the acids in one gram of crude oil in a nonaqueous type titration. Various procedures have been proposed for the alkaline waterflooding of those reservoirs in which the crude oil is considered to have an inadequate acid content as may be indicated by the acid number. One technique disclosed in U.S. Pat. No. 3,195,629 to Leach involves the injection of air, peroxides, or other oxidizing agents into the reservoir in order to oxidize the oil in situ to form additional organic acids. Additionally, a preoxidized oil bank may be injected or high molecular weight acids may be added to the injected oil bank. In any case, an aqueous alkaline solution is injected in order to form the sodium salts of the organic acids. Yet a further technique disclosed in U.S. Pat. No. 3,344,858 to Gilchrist et al. involves an alkaline waterflood process in which an aqueous alkaline slug is injected first and then followed with a hydrocarbon slug containing organic acids. These acids are neutralized in situ to form the corresponding surface-active salts.

A somewhat different technique involving the injection of an aqueous alkaline medium is disclosed in U.S. Pat. No. 3,368,621 to Reisberg. This process, described by the patentee as a miscible drive method which "should not be confused with the in situ generation of surfactants . . .", involves the injection of a slug of preferentially oil-soluble carboxylic acids having less than 12 carbon atoms per molecule and following this with an aqueous alkaline medium. As the injected fluids travel through the reservoir, the injected organic acids are neutralized to their corresponding alkali metal salts. The patentee also discloses that organic acids can be regenerated by collecting the frontal portion of the driving medium and treating it with a strong mineral acid. This treatment converts the water-soluble alkali metal salts to the corresponding carboxylic acids which can then be reused in the process.

SUMMARY OF THE INVENTION

In accordance with the present invention there is provided a new and improved waterflooding process in which the interfacial tension between the reservoir oil and injected water is reduced by means of surface-active monovalent metal soaps which are derived from divalent metal soaps contained within a petroleum oil. In accordance with one embodiment of the invention a petroleum oil, which may be a crude oil or a fraction thereof, which contains divalent metal soaps is contacted with a strong mineral acid solution in order to convert the heavy metal soaps to the corresponding organic acids. The organic acids thus obtained are then injected into the subterranean oil reservoir. In addition, an aqueous alkaline solution is injected in order to neutralize the organic acids in situ to the corresponding surface-active monovalent metal salts. Thereafter, an aqueous flooding medium is injected in order to displace the reservoir oil to a production system penetrating the reservoir and from which the oil is recovered.

In another embodiment of the invention, divalent metal soaps found within a petroleum oil are converted to organic acids as described above. Thereafter, the resulting acids are contacted aboveground with an aqueous alkaline solution in order to convert the acids to the corresponding surface-active monovalent metal soaps. These monovalent metal soaps are then injected and thereafter an aqueous flooding medium is injected to displace the reservoir oil to the production system.

BRIEF DESCRIPTION OF THE DRAWING

The drawing is an illustration exhibiting one form of a well pattern which may be employed in practicing the present invention.

DESCRIPTION OF SPECIFIC EMBODIMENTS

The present invention may be carried out utilizing injection and production systems as defined by any suitable arrangement of wells. One well arrangement commonly used in waterflooding operations and suitable for use in carrying out the present invention is an integrated five-spot pattern of the type illustrated in the drawing. In the drawing, the legend o is used to indicate a production well and the legend ● is used to indicate an injection well. As shown in the drawing, this integrated pattern comprises a plurality of five-spot patterns, each of which comprises a central production well, as indicated by reference numeral 2, and four peripheral injection wells, as indicated by reference numerals 3, 4, 5, and 6.

The quantities of fluids injected in accordance with the invention may be expressed in terms of the formation "pore volume". By the quoted expression is meant the pore volume of the formation underlying the well pattern defined by the wells comprising the injection and production systems. Thus, the term "pore volume" as used with reference to the pattern shown in the drawing is the pore volume of that portion of the formation underlying the area enclosed by broken line 8. Of course, other well arrangements may be used in carrying out the present invention, examples of which are set forth in the previously mentioned Burdyn et al. application.

As noted previously, the various alkaline waterflooding procedures require the presence of organic acids that may be neutralized with alkaline agents such as sodium hydroxide to form water-soluble soaps which act to reduce the interfacial tension between the injected water and the reservoir oil. As recognized in the prior art, these organic acids may be indigenous to the reservoir oil; or, where the reservoir oil contains insufficient acids, they may be added to the reservoir oil by various injection procedures.

In some cases the reservoir oil may itself exhibit a relatively low organic acid content as indicated by its acid number, but may contain significant amounts of metallic soaps, that is, soaps of the long-chained paraffinic or naphthenic acids or other organic acids and the divalent metals such as calcium, magnesium, and barium. Such metallic soaps are most likely to be prominent in those crude oils which are associated with reservoir water having a high divalent metal ion content and a basic or neutral pH. Normally, calcium ions will predominate with lesser amounts of magnesium and usually only trace amounts of barium.

The initial step in carrying out the present invention is the treatment of a petroleum oil containing the divalent metal soaps with a mineral acid solution. The acid solution and petroleum oil may be mixed together in a batch-type process or, alternatively, in a continuous-type process in which the oil and acid solution are contacted in a countercurrent or concurrent flow reaction chamber. Regardless of the particular reaction technique employed, the effluent from the reaction zone is separated into an oil phase which contains most of the organic acids derived from the corresponding divalent metal salts and an aqueous phase which contains most of the divalent metal ions.

The acid employed to form the aqueous acid solution may be any suitable inorganic acid capable of converting the salts to the corresponding carboxylic acids. Suitable acids include hydrochloric acid, hydrofluoric acid, sulfuric acid, nitric acid, and phosphoric acid. Such acids have long been used in petroleum refining operations in order to improve the color or odor of petroleum products or to remove undesirable impurities. Sulfuric acid, particularly, has seen widespread use in acid refining, and petroleum sulfonates produced as by-products may be employed in low tension waterflooding as described in the aforementioned paper by Foster.

The strength of the acid solution employed in the acid-washing procedure normally should be within the range of about 0.1 to 3.0 normal. The use of concentrated acids in treating some oils may cause precipitation of an undesirable acid sludge; in these cases the acid concentration should be reduced.

The acid-washing procedure may be carried out at the ambient temperature of the oil or at higher temperatures. Since the cation-exchange reaction is accelerated as the temperature is increased, it is desirable to treat the oil at an elevated temperature, but the boiling point of water should not be exceeded.

Preferably, the mineral acid employed is one whose calcium salt is substantially water insoluble and precipitates from aqueous solution in order to facilitate the separation of the calcium produced during the acid-wash procedure. In this respect, an acid such as hydrofluoric acid or sulfuric acid may be employed, with the latter usually being preferred from the standpoint of economics and handling. However, satisfactory results may also be obtained with an acid, such as hydrochloric acid, whose calcium salt is water soluble. In this case, a subsequent water wash, as discussed hereinafter, may be desirable.

The petroleum oil feedstock which is treated by the acid-washing step may be a distillate fraction such as may occur during a conventional petroleum refining operation. The oil fraction should not have been subjected to a previous acid treatment in the refining operation. Alternatively, the oil feedstock may be an unrefined crude oil. The latter normally will be used where the acid wash is carried out at the oil field site, in which case the feedstock may be lease crude which is diverted from delivery to the pipeline. The lease crude oil feedstock normally will not be subject to prior treatment other than the preliminary field processing steps which are usually carried out to separate gas, water, and sediments from the crude oil as explained, for example in Chapter XI, Uren, L. C., PETROLEUM PRODUCTION ENGINEERING — OIL FIELD EXPLOITATION, Third Edition, McGraw-Hill Book Company, Inc., New York, Toronto, London (1953).

Subsequent to the acid wash, the oil phase containing the organic acids is separated from the aqueous phase by any suitable procedure. At this stage it is sometimes beneficial for the oil to be treated further to remove undesirable impurities. For example, the oil phase may be washed with water in order to remove excess mineral acids and inorganic salts which may be entrained in the oil phase. The water wash is usually desirable when employing an acid whose calcium salt is water soluble or when employing a concentrated acid solution. The water wash may also be employed when a high viscosity oil is used as the feedstock.

The organic acids obtained from the acid-washing step may be employed in the oil displacement recovery process in one of two ways. In one embodiment of the invention, the oil phase containing the organic acids is injected into the formation to provide a source of acids in the reservoir, and an aqueous solution of an alkaline agent is injected in order to convert the organic acids to their corresponding monovalent soaps in situ. In this embodiment of the invention, the alkalinity of the aqueous alkaline medium normally will be adjusted to a pH within the range of 11.5 to 13 as described in the aforementioned Burdyn et al. application. The alkaline agent employed preferably is sodium hydroxide, although other alkaline metal or ammonium hydroxides or carbonates may be used. In addition, it will be preferred to add a monovalent salt to the aqueous alkaline medium in order to enhance the interfacial reduction mechanism in the oil displacement process. While the desired salinity for optimum oil displacement is specific with regard to particular reservoir oil-organic acid systems, the preferred monovalent salt salinity normally will be within the range of 0.5 to 2.0 weight percent as described in greater detail in the aforementioned Burdyn et al. application. The salinity of the aqueous alkaline solution usually will be controlled by the additions of sodium chloride since this salt is inexpensive and normally readily available. However, salinity control can be accomplished by means of other monovalent salts, particularly the alkali metal chlorides such as potassium chloride.

In carrying out the invention it usually will be desirable to inject a thickening agent for mobility control purposes. The thickening agent may be added initially to the aqueous alkaline solution or may be injected in a separate aqueous slug. Usually, it will be preferred to inject the thickening agent in a mobility control slug subsequent to the injection of at least an initial portion of the aqueous alkaline solution and to adjust the alkalinity and monovalent salinity of the mobility control slug to values within the ranges set forth above. The viscosity of the mobility control slug is greater than the viscosity of the initially injected aqueous alkaline solution and normally will fall within the range of 1 to 4 times the viscosity of the reservoir oil.

Various thickening agents which may be employed to increase the viscosity or apparent viscosity of the mobility control slug are well known to those skilled in the art and include such naturally occurring materials as guar gum or Karaya gum, or such synthetic materials as the polysaccharide B-1459 available from the Kelco Chemical Company under the trade name "Kelzan", poly(glucosylglucan)s, such as disclosed in U.S. Pat. No. 3,372,749 to Williams, and available from the Pillsbury Company under the trade name "Polytran", or the partially hydrolyzed polyacrylamides available from the Dow Chemical Company under the trade name of "Pusher Chemicals." An ionic polysaccharide such as Kelzan usually will be preferred as the thickening agent for reasons set forth more fully in the aforementioned Burdyn et al. application.

With respect to quantities of the several slugs employed in the present invention, the oil slug of organic acids normally will be injected in an amount within the range of 0.01 to 0.1 pore volume followed by the initial aqueous alkaline solution in an amount within the range of 0.01 to 0.1 pore volume but not necessarily the same pore volume amount as the oil slug. The relatively viscous mobility control slug typically will be injected in an amount within the range of 0.05 to 0.3 pore volume. The viscosity of the mobility control slug preferably is graded from a maximum viscosity of at least the viscosity of the reservoir oil to the viscosity of water. This is accomplished by progressively decreasing the concentration of polymeric thickening agent from its maximum value, normally a concentration within the range of 250 to 2500 ppm in the case of Kelzan, down to a concentration of zero. The thickening agent concentration may be decreased linearly or nonlinearly by increments.

Subsequent to the injection of the mobility control slug, a driving fluid is injected in order to displace the previously injected fluids through the formation. The driving fluid typically may be any water which is locally available and is not incompatible with the formation. The driving fluid is injected in such an amount, normally within the range of 0.5 to 2.0 pore volumes, as is necessary to carry the displacement process substantially to completion.

As noted previously, the invention also may be carried out by means of a process in which the organic acids derived from the acid-wash step and contained in the oil phase are neutralized aboveground to the corresponding surface-active monovalent metal soaps. These soaps contained in a water-oil mixture are then injected in order to decrease the interfacial tension between the subsequent displacing water and the reservoir oil.

The aboveground neutralization of the organic acids may be accomplished by any suitable technique. For example, the oil phase from the acid-wash step may be mixed with a suitable alkaline medium such as an aqueous solution of sodium hydroxide. The alkaline medium may be at a pH within the range of 11.5 to 13 and mixed with the oil phase at a volumetric ratio of one-to-one to one-to-nine aqueous phase-to-oil phase. The resulting mixture containing a water phase of about 10 to 50 percent by volume and an oil phase within the range of 90 to 50 percent by volume is then injected into the subterranean oil reservoir. The pH and monovalent salt salinity of this slug may be adjusted as described previously, for example, by addition of salt to the aqueous alkaline solution, and is followed by a mobility control slug and a final driving fluid as described above.

As has been recognized in the prior art, divalent metal ions such as calcium and magnesium have a deleterious effect on alkaline waterflooding, since such ions tend to precipitate the neutralized organic acids formed in situ. This same situation obtains for the neutralized organic acids employed in the present invention whether formed in situ or aboveground. Accordingly, where the water within the reservoir contains divalent metal ions in an amount of more than about 50 ppm, it usually will be desirable to initially inject a protective slug in an amount within the range of 0.1 to 0.5 pore volume in order to displace the formation brine and provide a "buffer" between the formation brine and the subsequently injected organic acids or neutralized organic acids. Similar considerations prevail where the formation brine contains a relatively high concentration of monovalent salts such as sodium chloride. For example, if the formation brine exhibits a monovalent salt salinity significantly in excess of 2.0 percent, it usually will be preferred to inject a pretreatment slug regardless of the concentration of divalent ions present in the reservoir water. The pretreatment slug injected normally will contain sodium chloride in the range of 0.5 to 2.0 weight percent and should, of course, be substantially free of divalent metal ions. As a practical matter, water containing divalent metal ions in a concentration no greater than 50 ppm may be used in forming the pretreatment slug as well as the subsequently injected slugs.

I claim:

1. In the recovery of oil from a subterranean oil reservoir penetrated by spaced injection and production systems, the method comprising:
   a. contacting a petroleum oil containing divalent metal soaps with an aqueous mineral acid solution to convert said soaps to organic acids,
   b. injecting said organic acids into said reservoir via said injection system,
   c. injecting into said reservoir via said injection system an aqueous alkaline solution to neutralize said organic acids to surface-active monovalent metal soaps,
   d. thereafter introducing into said reservoir via said injection system an aqueous flooding medium to displace oil to said production system, and
   e. recovering oil from said production system.

2. The method of claim 1 wherein said acid solution comprises an acid the calcium salt of which precipitates from aqueous solution.

3. In the recovery of oil from a subterranean oil reservoir penetrated by spaced injection and production systems, the method comprising:
   a. contacting a petroleum oil containing divalent metal soaps with an aqueous inorganic mineral acid solution to convert said soaps to organic acids,
   b. contacting said organic acids with an aqueous alkaline solution to convert said acids to surface-active monovalent metal soaps,
   c. injecting said monovalent metal soaps into said reservoir via said injection system,
   d. thereafter introducing into said reservoir via said injection system an aqueous flooding medium to displace oil to said production system, and
   e. recovering oil from said production system.

4. The method of claim 3 wherein said acid solution comprises an acid the calcium salt of which precipitates from aqueous solution.

* * * * *